US009311584B2

(12) United States Patent
Al-Omari et al.

(10) Patent No.: US 9,311,584 B2
(45) Date of Patent: Apr. 12, 2016

(54) MULTIDIMENSIONAL COLOR BARCODE

(71) Applicant: King Abdul Aziz City for Science and Technology (KACST), Riyadh (SA)

(72) Inventors: Hussein Khalid Al-Omari, Amman (JO); Mohammad Sulaiman Khorsheed, Riyadh (SA)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 302 days.

(21) Appl. No.: 13/901,776

(22) Filed: May 24, 2013

(65) Prior Publication Data

US 2014/0346231 A1    Nov. 27, 2014

(51) Int. Cl.
*G06K 7/12* (2006.01)
*G06K 19/06* (2006.01)
*G06K 7/14* (2006.01)

(52) U.S. Cl.
CPC .............. *G06K 19/0614* (2013.01); *G06K 7/12* (2013.01); *G06K 7/1417* (2013.01); *G06K 19/06037* (2013.01)

(58) Field of Classification Search
CPC ............ G06K 19/0614; G06K 7/1417; G06K 19/06037; G06K 7/14; G06K 7/12; G07D 7/0026
See application file for complete search history.

(56) References Cited

U.S. PATENT DOCUMENTS

| 4,924,078 | A * | 5/1990 | Sant'Anselmo | G06K 7/1456 235/487 |
| 7,032,823 | B2 * | 4/2006 | Nojiri | G06K 19/06037 235/462.01 |
| 2005/0285761 | A1 * | 12/2005 | Jancke | 341/50 |
| 2008/0000991 | A1 * | 1/2008 | Yin | G06K 1/123 235/494 |
| 2011/0290882 | A1 * | 12/2011 | Gu | G06K 7/1456 235/462.11 |
| 2014/0144991 | A1 * | 5/2014 | Tian | G06K 7/1417 235/462.04 |

* cited by examiner

*Primary Examiner* — Sonji Johnson
(74) *Attorney, Agent, or Firm* — Timberline Patent Law Group PLLC

(57) ABSTRACT

The invention provides architecture of a multidimensional color barcode. The multidimensional color barcode includes a plurality of data cells and a plurality of palette cells which are placed in a predefined order on each side of the multidimensional color barcode. The multidimensional color barcode also includes one or more alternating black and white tic marks placed on two sides of the multidimensional color barcode. Data is encoded and decoded in the multidimensional color barcode using color assigned to each of the plurality of data cells and the plurality of palette cells.

6 Claims, 4 Drawing Sheets
(2 of 4 Drawing Sheet(s) Filed in Color)

MULTIDIMENSIONAL COLOR BARCODE

FIELD OF THE INVENTION

The invention generally relates to a multidimensional color barcode. More specifically, the invention relates to a method for generating a multidimensional color barcode.

BACKGROUND OF THE INVENTION

A black and white barcode is very widely used for recording digital information which is readable by an apparatus in a small space on a printed matter. However, such black and white barcodes have limited abilities in terms of recording information including large data such as a long document or a picture.

Originally black and white barcodes systematically represented data by varying the widths and spacing of parallel lines, and were referred to as linear or one-dimensional. Currently two dimensional barcodes are prevalent, the two dimensional codes use varieties of symbols like rectangles, dots, hexagons and other geometric patterns to store information.

As with increase in the storage requirement, color barcodes were introduced, as the color barcodes can store much more information than the black and white barcodes. The black and white barcodes record information using binary encoding, whereas color barcodes encode information using several colors by multi valued recording.

For decoding information from the color barcodes, scanners scan the various colors of the color barcodes. However, as the color barcodes go through usual wear and tear due to their age and/or constant usage, it becomes difficult to distinguish between colors of the color barcode using a scanner. Further, at times, a reference, associated with a color barcode, which is used to decode information encoded in a data of a color barcode also gets degraded over a time, this leads to error/difficulty in decoding the information.

There is therefore a need of an improved color barcode which is durable and enables reliable decoding of information.

BRIEF DESCRIPTION OF THE FIGURE

The patent or application file contains at least one drawing executed in color. Copies of this patent or patent application publication with color drawing(s) will be provided by the Office upon request and payment of the necessary fee.

The accompanying figures together with the detailed description below forms part of the specification and serves to further illustrate various embodiments and to explain various principles and advantages all in accordance with the present invention.

DETAILED DESCRIPTION OF THE INVENTION

Figure 1A:
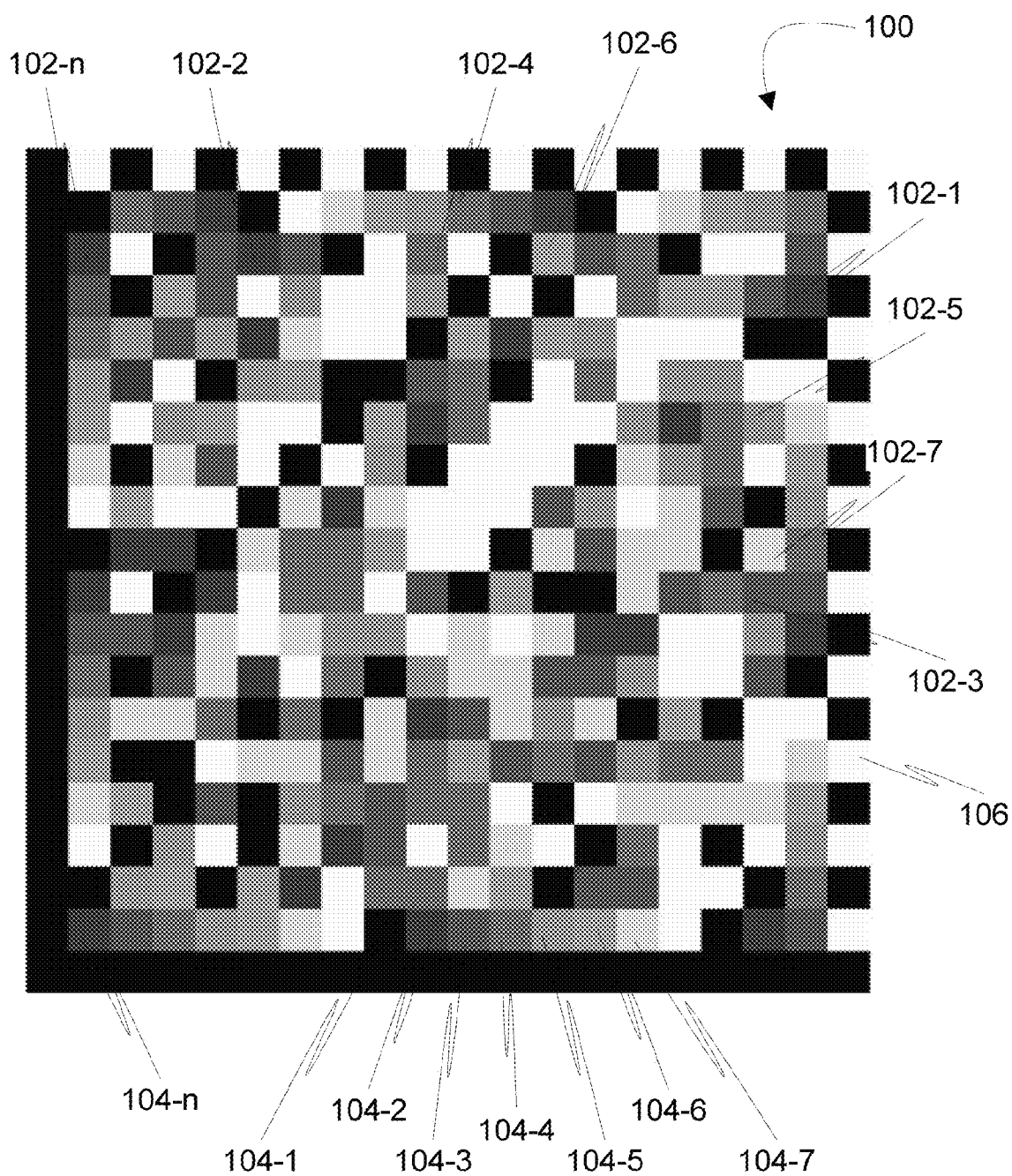
FIG. 1A illustrates architecture of a multidimensional color barcode in accordance with an embodiment of the invention.

Before describing in detail embodiments that are in accordance with the invention, it should be observed that the embodiments reside primarily in method steps related to generating a multidimensional color barcode. Accordingly, the method steps have been represented where appropriate by conventional symbols in the drawings, showing only those specific details that are pertinent to understanding the embodiments of the invention so as not to unnecessarily obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, apparatus or composition that comprises a list of elements does not include only those elements but may include other elements not expressly listed or inherent to such process, method, article, apparatus or composition. An element proceeded by "comprises . . . a" does not, without more constraints, preclude the existence of additional identical elements in the process, method, article, apparatus or composition that comprises the element.

Generally speaking, pursuant to various embodiments, the invention provides an architecture of a multidimensional color barcode. The multidimensional color barcode includes a plurality of data cells for encoding information and a plurality of palette cells that form a color palette. The plurality of palette cells are arranged in a predefined order in the color palette. A palette cell is assigned with a palette value based on the predefined order of the plurality of palette cells. Further, the plurality of palette cells are placed on each side of the multidimensional color barcode according to the predefined order. The information is encoded/decoded using colors associated with the plurality of data cells of the multidimensional color barcode by referring to the color palette and the predefined order of the plurality of palette cells in the color palette.

FIG. 1A illustrates architecture of a multidimensional color barcode 100 in accordance with an embodiment of the invention. As illustrated, multidimensional color barcode 100 includes plurality of data cells 102-*n* such as a data cell 102-1, a data cell 102-2, a data cell 102-3, a data cell 102-4, a data cell 102-5, a data cell 102-6 and a data cell 102-7 and plurality of palette cells 104-*n* such as a palette cell 104-3, a palette cell 104-4, a palette cell 104-5, a palette cell 104-6 and a palette cell 104-7. As shown, multidimensional color barcode 100 also includes alternating black and white tic marks 106. Multidimensional color barcode 100 can be for example, but not limited to, a three dimensional color barcode and a four dimensional color barcode.

In accordance with various embodiments of the invention, plurality of data cells 102-*n* are encoded with information. Each data cell of plurality of data cells 102-*n* is assigned with a color based on the information encoded in a data cell. For example, a data cell 102-1, a data cell 102-2, a data cell 102-3, a data cell 102-4, a data cell 102-5, a data cell 102-6 and a data cell 102-7 are encoded with information using a palette cell 104-1, a palette cell 104-2, a palette cell 104-3, a palette cell 104-4, a palette cell 104-5, a palette cell 104-6 and a palette cell 104-7 selected from plurality of palette cells 104-*n*.

Further, as shown in FIG. 1A, plurality of palette cells 104-*n* form a color palette. Plurality of palette cells 104-*n* are arranged in a pre-defined order in the color palette. Accordingly, a palette cell of (such as palette cell 104-1) is assigned with a palette value. This way, the color palette may be considered as an index of colors, wherein each color is referenced using a corresponding palette value. In an exemplary embodiment, a color palette includes seven different palette cells, wherein the colors are placed in a predefined order such that color of first palette cell is black and color of last palette cell is yellow. For example, palette cell 104-1 is black in color, palette cell 104-2 is pink in color, palette cell 104-3 is orange in color, palette cell 104-4 is gray in color, palette cell 104-5 is brown in color, palette cell 104-6 is green in color and palette cell 104-7 is yellow in color. In another embodiment, the color palette is placed along the periphery (sides) of multidimensional color barcode 100. Plurality of palette cells 104-n of the color palette are repeated and placed on each side of multidimensional color barcode 100. Thus, if a palette cell is damaged, a decoder may obtain reference colors from another palette cell of another color palette which is placed along the periphery of multidimensional color barcode 100. This is further explained in conjunction with description of FIG. 1B.

In accordance with various embodiments, plurality of data cells 102-n are encoded with information corresponding to two or more two dimensional barcodes. Accordingly, if the information encoded in data cell 102-1 corresponds to a two or more digits binary number, then each digit of the binary number depicts a value for a corresponding cell in a two dimensional barcode. For example, if data cell 102-1 stores 010 (binary number), then 0 represents a corresponding data cell on a first two dimensional barcode, 1 represents corresponding data cell on a second two dimensional barcode and 0 represents corresponding data cell on a third two dimensional barcode.

Similarly, a data cell is associated with a color based on a binary number encoded in the data cell. A decimal number corresponding to the binary number is used to derive a palette value. Thereafter, the palette value is used to pick a corresponding palette cell from the color palette. Subsequently, the data cell is associated with the corresponding color. The method of encoding of information in multidimensional color barcode 100 is explained in further detail in conjunction with description of FIG. 2.

In accordance with various embodiments, data from plurality of data cells 102-n is read using a data decoding device such as a scanner. The scanner reads-out a color assigned to each data cell of plurality of data cells 102-n. Thereafter, colors obtained from the read-out are matched with corresponding reference colors included in the color palette. Subsequently, palette values associated with the colors is used to obtain binary number associated with each data cell of multidimensional color barcode 100. Decoding process is explained in further detail in conjunction with description of FIG. 3.

Figure 1B:
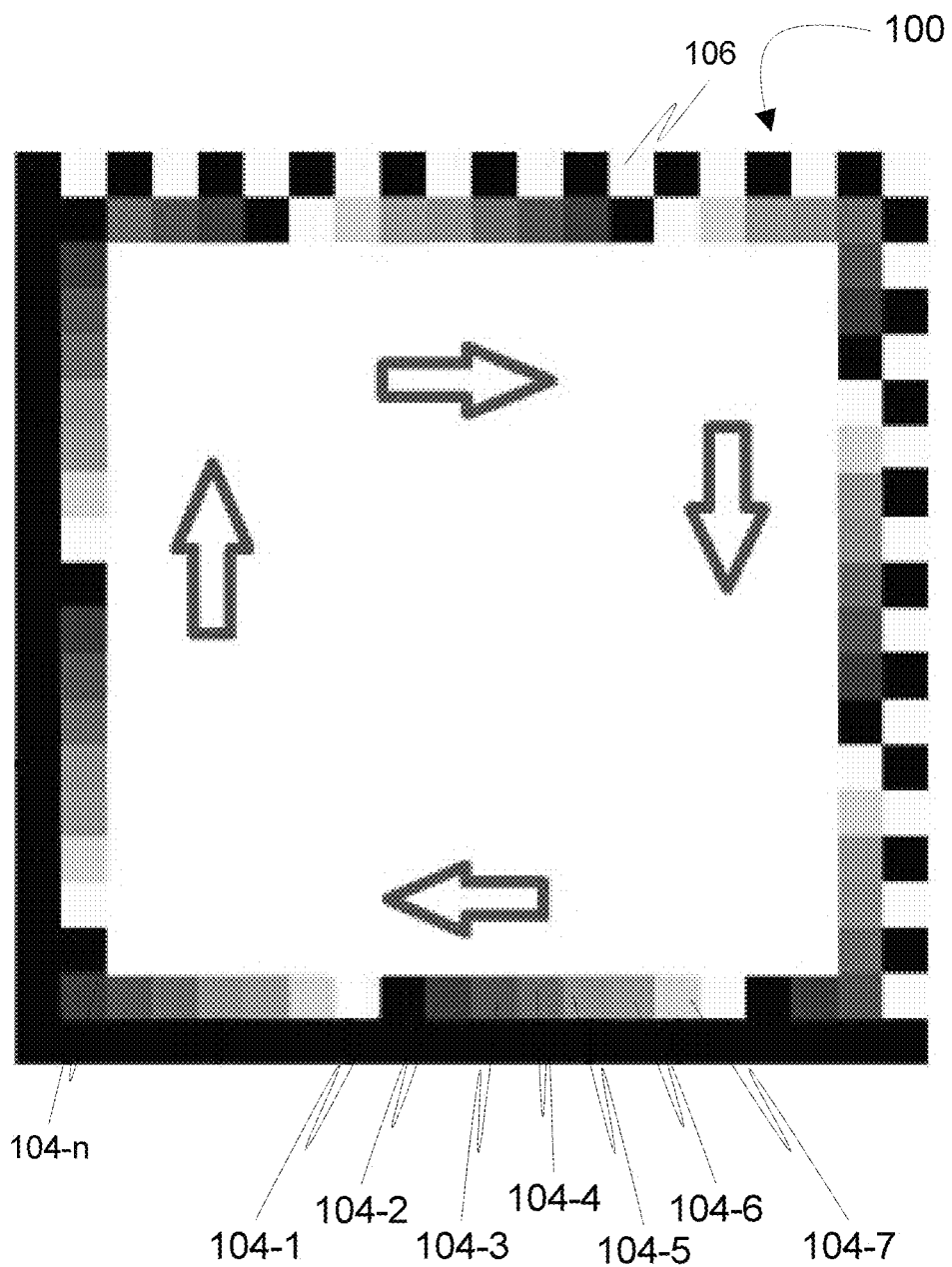
FIG. 1B illustrates a method of placing palette cells in color palettes in the multidimensional color barcode in accordance with various embodiments of the invention.

FIG. 1B illustrates a method of placing plurality of palette cells 104-n in the color palette in multidimensional color barcode 100 in accordance with various embodiments of the invention. In an embodiment, plurality of palette cells 104-n are placed repeatedly on each side of multidimensional color barcode 100. As explained earlier, plurality of palette cells 104-n are placed in a predefined order in the color palette. In an exemplary embodiment, a color palette includes seven different palette cells, wherein the colors are placed in a predefined order such that color of first palette cell is black and color of last palette cell is yellow. For example, palette cell 104-1 is black in color, palette cell 104-2 is pink in color, palette cell 104-3 is orange in color, palette cell 104-4 is gray in color, palette cell 104-5 is brown in color, palette cell 104-6 is green in color and palette cell 104-7 is yellow in color. The predefined order of placing palette cells in a color palette is repeated for each color palette. Each color palette is placed along the periphery of multidimensional color barcode 100. Consecutive color palettes are placed next to each other repeatedly along the periphery of multidimensional color barcode 100 by keeping a gap of one cell in multidimensional color barcode 100.

In an embodiment, in vertical direction of multidimensional color barcode 100, plurality of palette cells 104-n in the color palette are placed from bottom up whereas in horizontal direction of multidimensional color barcode 100 plurality of palette cells 104-n in the color palette are placed from right to left. This assists a data decoding device to match color of a data cell with a reference color. In a scenario, if the data decoding device is not able to detect a first reference color placed on a color palette on the horizontal side of multidimensional color barcode 100 because of insufficient light, then the data decoding device can obtain the reference color by checking another color palette placed on the vertical side of multidimensional color barcode 100.

Such placement improves redundancy in multidimensional color barcode 100, thereby improving reliability and durability of multidimensional color barcode 100. For example, even if one side of multidimensional color barcode 100 is degraded due to any reason, other sides may be used to refer one or more colors in the color palette for the purpose of decoding the information.

Figure 2:
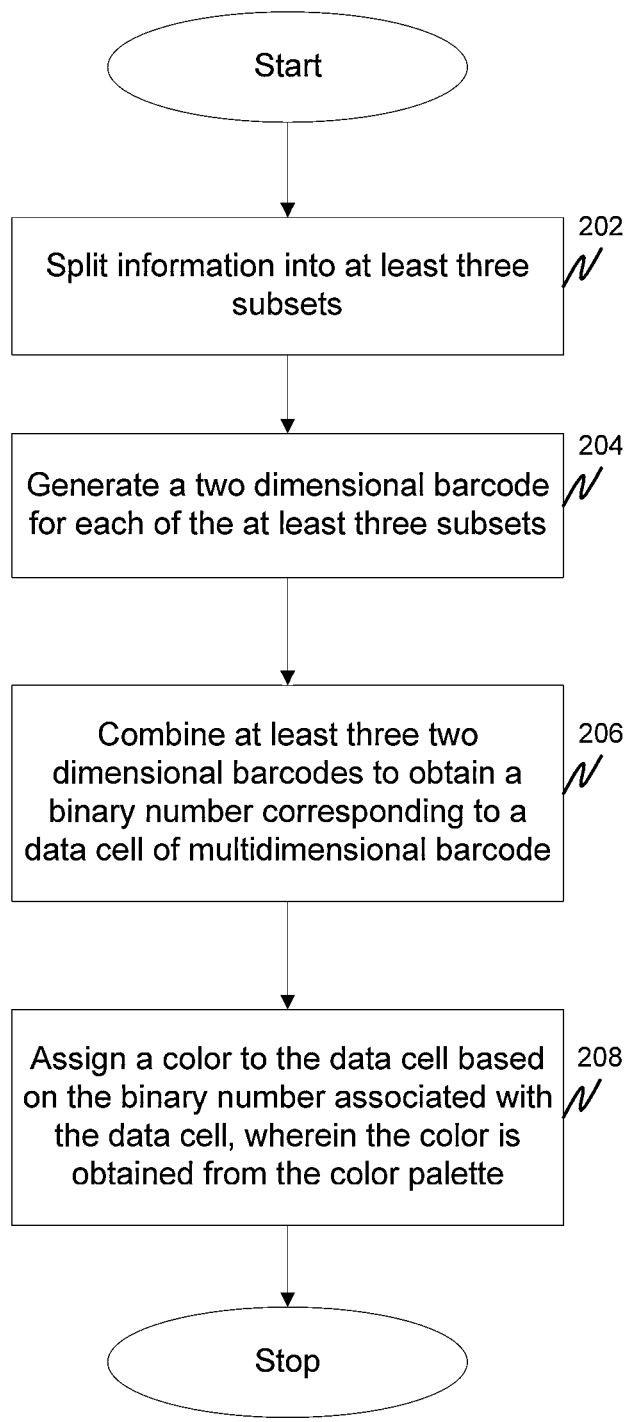
FIG. 2 illustrates a flow diagram for a method of encoding information in multidimensional color barcode in accordance with various embodiments of the invention.

Moving on to FIG. 2 which illustrates a flow diagram for a method of encoding information in multidimensional color barcode 100 in accordance with various embodiments of the invention. At step 202, information to be encoded in multidimensional color barcode 100 is split equally into three or more subsets. This forms layers for encoding information in multidimensional color barcode 100. The layer design for multidimensional color barcode 100 makes it stable for encoding. Subsequently, a two dimensional barcode is generated for each subset of the three or more subsets of information at step 204. Accordingly, several two dimensional barcodes are generated and each two dimensional barcode is equal in size. In an embodiment, a two dimensional barcode is one of, but not limited to, black and white barcode, datamatrix or a Quick Response (QR) code.

Once the three or more two dimensional barcodes are generated, at step 206, the three or more two dimensional barcodes are combined to obtain a binary number corresponding to each data cell of multidimensional color barcode 100. Each digit of a binary number depicts a value of a data cell of each of the three or more two dimensional barcodes. For example, if the binary number is 111, then a first digit, 1, represents a corresponding data cell on a first two dimensional barcode, a second digit, 1, represents corresponding data cell on a second two dimensional barcode and a third digit, 1, represents corresponding data cell on a third two dimensional barcode.

Moving on, a binary number associated with a data cell is converted to a corresponding decimal number. A decimal number is considered as a palette value and accordingly, the color palette is referred to, in order to determine a corresponding color with the palette value. Subsequently, a color is assigned to each data cell of multidimensional color barcode 100 at step 208.

Figure 3:
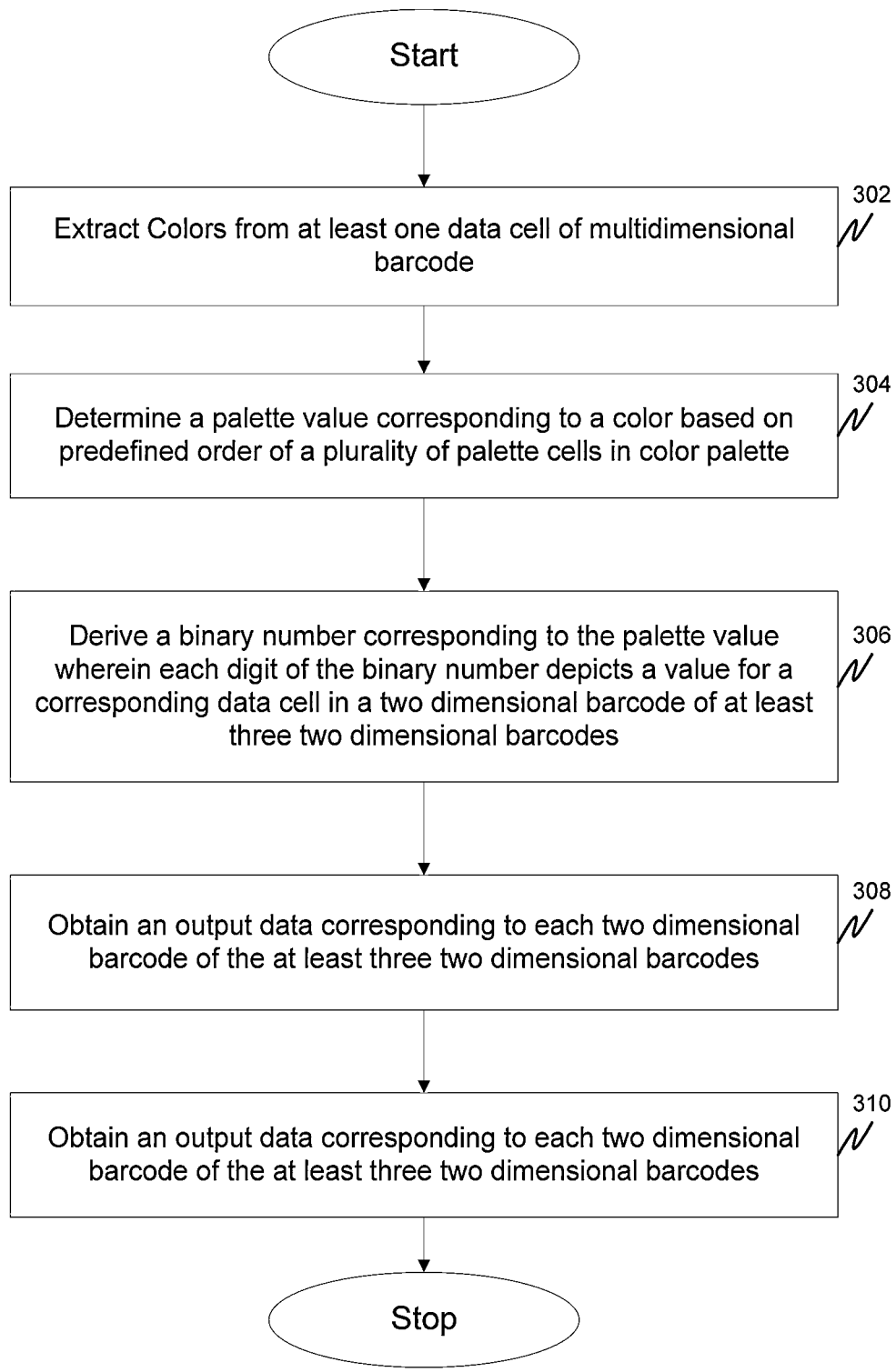
FIG. 3 illustrates a flow diagram for a method of decoding information in multidimensional color barcode in accordance with various embodiments of the invention.

FIG. 3 illustrates a flow diagram for a method of decoding information in multidimensional color barcode 100 in accordance with various embodiments of the invention. At step 302, colors from plurality of data cells 102-n of multidimensional color barcode 100 are extracted using an information decoding device. In an embodiment, the information decoding device is one of, but not limited to, a scanner and an image capturing device. In an embodiment, the information decoding device captures a binarized version of multidimensional color barcode 100 to obtain a temporary black and white code of multidimensional color barcode 100. The temporary black and white code is used to obtain L-shape side of multidimensional color barcode 100 and alternating black and white tic marks 106. The L-shape side of multidimensional color barcode 100 and alternating black and white tic marks 106 assist in extracting colors from plurality of data cells 102-n of multidimensional color barcode 100.

Moving on, a color which is extracted is matched with a reference color in a color palette. As explained earlier, plurality of palette cells 104-n are arranged in a predefined order in the color palette. Further, each palette cell is associated with a palette value based on its position in the predefined order. Extracted color is matched with a reference color in the color palette which is closest to the extracted color. This assists the data decoding device in identifying the reference color, since the reference color has same lighting strength and intensity as color of the data cell. In a scenario, if the reference color in a particular color palette is damaged, then corresponding reference color is referenced from other color palettes placed on other sides of multidimensional color barcode 100. For example, if a red color is extracted from a data cell of multidimensional color barcode 100, then the red color is matched with corresponding reference red color from a color palette which is closest to the data cell. If the corresponding reference red color is damaged, then reference red color from another color palette is chosen. This process continues until a reference red color is obtained which has same lighting strength and intensity as color of the data cell.

Thereafter, at step 304, a palette value corresponding to the color is determined based on its position in the predefined order. At step 306, binary number corresponding to the palette value is derived wherein each digit of the binary number depicts a value for a corresponding data cell in a two dimensional barcode of three or more two dimensional barcodes. For example, if a color associated with a data cell is red, and a position of the red color is 5 in the color palette, then a palette value for the color red is 5. Accordingly, binary number corresponding to decimal number 5 is 101. Therefore, the data cell was encoded with the information corresponding to the binary number 101. In accordance with the embodiment of the invention, each of the digits of the binary number corresponds to a value a corresponding data cell of a two dimensional barcode. For example, for the binary number 101, the first digit 1 indicates value of a data cell of a first two dimensional barcode, the second digit 0 represents corresponding data cell of a second two dimensional barcode and the third digit 1 represents corresponding data cell in a third two dimensional barcode. This assists in obtaining values of data cells of each of the three or more two dimensional barcodes. Subsequently, at step 308, output data corresponding to each of the three or more two dimensional barcodes is obtained. Thereafter, at step 310, output data corresponding to each of the three or more two dimensional barcodes are combined to retrieve the information encoded in multidimensional color barcode 100

Various embodiments of the invention disclosed herein provide a multidimensional color barcode with improved durability and reliability. In accordance with an embodiment of the invention one or more color palettes are repeatedly placed on each side of the multidimensional color barcode for assisting reliable decoding of information in case one or more color palettes gets degraded over a period of time.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figure are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method for encoding information in a multidimensional color barcode, wherein the multidimensional color barcode comprises a plurality of data cells and a color palette placed on each side of the multidimensional color barcode, wherein the color palette comprises a plurality of palette cells, the method comprising:
  splitting the information into at least three subsets;
  generating a two dimensional barcode for each of the at least three subsets;
  combining at least three two dimensional barcodes to obtain a binary number corresponding to a data cell of the multidimensional color barcode; and
  assigning a color to the data cell based on the binary number associated with the data cell, wherein the color is obtained from the color palette.

2. The method of claim 1, wherein the plurality of palette cells are arranged in a predefined order, wherein a palette cell is assigned with a palette value based on the predefined order of the plurality of palette cells.

3. The method of claim 2, wherein a binary number associated with a data cell is converted to a decimal number, wherein the decimal number corresponds to a palette value of the palette cell in the color palette.

4. The method of claim 1, wherein a two dimensional barcode is one of a black and white barcode, datamatrix and QR code.

5. A method for decoding information from a multidimensional color barcode, wherein the multidimensional color barcode comprises a plurality of data cells and a color palette placed on each side of the multidimensional color barcode, wherein the color palette comprises a plurality of palette cells, the method comprising:
  extracting colors from at least one data cell of the multidimensional color barcode;
  determining a palette value corresponding to a color based on a predefined order of the plurality of palette cells in the color palette;
  deriving a binary value corresponding to a palette value, wherein each digit of the binary value depicts a value for a corresponding data cell in a two dimensional barcode of at least three two dimensional barcodes;
  obtaining an output data corresponding to each two dimensional barcode of the at least three two dimensional barcodes; and
  combining output data corresponding to each two dimensional barcode of the at least three two dimensional barcodes.

6. The method of claim 5, wherein a two dimensional barcode is one of a black and white barcode, datamatrix and QR code.

* * * * *